Patented Apr. 11, 1939

2,153,801

UNITED STATES PATENT OFFICE 2,153,801

ACID-AMINE CONDENSATION PRODUCT

Almon G. Hovey, Pleasant Ridge, and Theodore S. Hodgins, Detroit, Mich., assignors to Helmuth Reichhold, doing business as Reichhold Chemicals, Detroit, Mich.

No Drawing. Application June 10, 1937, Serial No. 147,569

2 Claims. (Cl. 260—2)

The invention relates to acid-amine condensation products, and the process of making the same.

The claims of the present application are related particularly to the production of resins by reacting isobutylamine and a polyfunctional carboxylic acid, wherein the acid and amine comprise the principal reacting ingredients.

There are more than two hundred published patents on urea condensation products but practically all of them are tedious delicate processes requiring very careful control of such conditions as pH and temperature. The ingredients must be carefully reacted in a certain prescribed order and very specific directions followed or else the product is likely to go over to a useless white insoluble precipitate, or else to a gel. Practically all of these patents covering urea resins are intended for moulding purposes. The preparation of surface coating resins from urea is much more difficult than the preparation of moulding compositions. Surface coating resins must be miscible with the commonly used paint, varnish and lacquer ingredients, and require skill not given in any publication heretofore.

Furthermore in the manufacture of urea resins it has not been possible to make products which are as easy to cook or as fool-proof in manufacturing as the alkyd resins. It has not been possible to make resins by fusing urea or other amines with other reactive ingredients at relatively high temperatures because gelation inevitably takes place at too rapid a rate even for a rough control. In general, the best results have been obtained with urea and formaldehyde on the acid side of neutrality. But even here, the reacting conditions are too sensitive to be very useful as a means for the difficult large scale factory production of the type which present-day production requires. When urea and formaldehyde are reacted on the alkaline side of neutrality there is always a very great tendency towards the formation of a white precipitate which is useless for coating compositions, although it might in some cases be used for moulding. Even if fairly good methods of control were developed to prevent loss of the batch, it is very likely that the loss of only one or two of these batches would be sure to wipe out the margin of profit of perhaps a year's production. A fusion method would be highly desirable because it would avoid the tendency towards precipitation when an aqueous formaldehyde solution is used and it would avoid dangerous formation of steam should the reaction "run away". Furthermore, the fusion method would allow the use of higher temperatures similar to those used in alkyd resin formation and with a much better chance of obtaining resinification than if the reaction were carried on in an aqueous solution.

We have found that a new and useful group of resins is formed when various organic acids are reacted with urea, isobutyl amine or with several other amines. The acids which we have found useful in forming resins with the amines are divided into the following classification:

I. Ketonic acids
    II. Unsaturated acids
    III. Dibasic acids
    IV. Hydroxy acids
    V. Polybasic acids
    VI. Cyclic acids
    VII. Amino acids We do not mean to say that every acid falling under these headings will form a useful product when reacted with urea, isobutyl amine or other amines. We do mean to say, however, that very many acids which come under these headings do form new and useful resins, and that all the resinous products which are formed from such acid-amine combinations come under the scope of this invention.

I. Ketonic acids:
    A. Alpha-ketonic—
        1. Pyruvic
        2. Aceto acetic acid
    B. Other ketonic
        1. Benzoyl benzoic
        2. Benzophenone-dicarboxylic
        3. Benzoyl acrylic acid Pyruvic acid forms yellow-orange to red-orange resins with urea, isobutyl amine and most other amines in Group IX. Like tartaric acid, pyruvic acid reacts with most of the acids in Groups I–VIII.

Aceto acetic acid ester forms a light yellow resin with urea, probably due to the hydrolysis of the ester to a ketonic acid.

The ketonic acids of Group B react with urea and isobutyl amine to form, in the case of benzoyl benzoic acid, pale yellow resins. With these amines, benzophenone-dicarboxylic acid forms water-white to red resins. Benzoyl acrylic acid forms a red-brown resin with urea, an orange balsam with isobutyl amine, and a yellow-orange resin with aniline. Furthermore, these acids react with most of the amines mentioned later in Group IX to form varied colored resins. For example, acetamide and formamide give green resins with benzoyl benzoic acid and the others being from yellow-orange to brown-black products.

Benzoyl benzoic acid reacts with itself to form a straw colored resin and with most other acids in Groups I–VIII, it forms yellow to brown resins. That resinification takes place is shown by the decrease in acid number and maturing of the resin when one mol of urea and one mol of benzoyl benzoic acid are reacted:—

| Time at 150° C.[1] | Acid number | Cure[2] | Color of product |
|---|---|---|---|
| | | Seconds | |
| 0 minutes | 164 | 25 | Water-white. |
| 5 minutes | 160 | 14 | Do. |
| 10 minutes | 154 | 12 | Do. |
| 15 minutes | 132 | 9 | Pale yellow. |
| 20 minutes | 115 | 8 | Yellow. |
| 25 minutes | 98 | 5 | Do. |
| 30 minutes | 88 | 2 | Do. |

[1] 10 minutes were required to fuse the materials and obtain 150° C.
[2] Hot plate temperature 200° C.

II. Unsaturated acids:
   A. Monobasic—
      1. Crotonic
      2. Abietic
   B. Dibasic—
      1. Itaconic
      2. Maleic
      3. Terpene maleic
   C. Cyclic—
      1. Cinnamic Crotonic acid forms yellow to yellow-orange resins with urea and with isobutyl amine. The decrease in maturing of the resin is shown by the following table:

*Change in acid number and cure of a resin formed from two mols of crotonic acid and one mol of urea*

| Time at 200° C.[1] | Acid number | Cure[2] | Color of product |
|---|---|---|---|
| | | Seconds | |
| 0 minutes | 183 | 37 | Brown. |
| 5 minutes | 145 | 30 | Do. |
| 10 minutes | 63 | 19 | Do. |

[1] 10 minutes were required to fuse the material and reach 200° C.
[2] Hot plate temperature 200° C.

Abietic acid reacts with urea to form a hard, brittle clear orange resin; with thiourea to form a pale orange hard and clear resin; and with aniline to form a red-orange resin.

Group B acids form pale yellow through brown to red resins with urea and isobutyl amine.

Cinnamic acid reacts with urea and isobutyl amine to form yellow to dark brown resins.

III. Dibasic acids:
   A. Saturated—
      1. Oxalic
      2. Succinic
      3. Dichlor succinic
      4. Adipic
      5. Sebacic
      6. Naphthalic
   B. Unsaturated—
      See II, part B, unsaturated acids
   C. Hydroxy—
      1. Malic
   D. Dihydroxy—
      1. Tartaric Group A saturated dibasic acids form water-white through pale yellow to red and brown resins with urea and isobutyl amine.

Tartaric acid forms yellow-orange to brown-orange resins with urea and isobutyl amine; it further forms orange through red to brown resins with most of the amines listed in Group IX. Tartaric acid also forms a water-white resin with itself and yellow through orange to brown resins, with most other acids in Groups I–VIII.

IV. Hydroxy acids:
   A. Monobasic—
      1. Lactic
      2. Gluconic
      3. Glucono-delta-lactone
   B. Dibasic—
      1. Tartaric
      2. Malic
   C. Polybasic—
      1. Citric
   D. Cyclic—
      1. Parahydroxybenzoic
      2. Salicylic
      3. 3-phenyl salicylic The acids of Group A form yellow-orange to red-brown balsams and resins with urea and isobutyl amine. Tartaric acid forms yellow-orange to brown-orange resins with urea and isobutyl amine; and dark red to brown resins with most other amines listed in Group IX. Citric acid forms pale yellow resins with urea and isobutyl amine.

Group D acids form water-white through yellow to red resins with urea and isobutyl amine.

V. Polybasic acids:
   A. Saturated—
      1. Tricarballylic
   B. Hydroxy—
      1. Citric Tricarballylic acid forms a water-white resin with urea and a yellow-orange resin with isobutyl amine and with triethanolamine; with tartaric acid a brown resin is formed; with benzoyl benzoic acid a yellow-orange resin. Furthermore, a yellow-orange resin results from heating tricarballylic acid with itself to form a condensation product.

Citric acid forms pale yellow resins with urea and with isobutyl amine and yellow to orange resins with most other amines in Group IX. Citric acid forms a yellow-orange resin with itself; a pale yellow resin with ethyl aceto acetate. Citric acid forms a brown resin with an amino acid, such as aspartic acid.

VI. Cyclic acids:
      1. Isophthalic
      2. Terephthalic
      3. Ortho phthalic
      4. Salicylic
      5. 3-phenyl-salicylic
      6. Naphthenic The phthalic acids do not form resins with urea and isobutyl amine under ordinary conditions. Salicylic acid forms water-white to pale yellow resins with urea and isobutyl amine. 3-phenyl salicylic acid forms red to red-brown resins with urea and isobutyl amine. Naphthenic acid forms a yellow resin with isobutyl amine.

VII. Amino acids:
      1. Para amino benzoic
      2. Aspartic

The amino acids of this group form brown resins with urea and with benzoyl benzoic acid. They form yellow-orange resins with terpene maleic anhydride, and also form water-white resins with isobutyl amine if triethanolamine is used as a catalyst.

VIII. Ketonic bodies:
1. Benzophenone
2. Benzophenone-dicarboxylic acid
3. Anthraquinone
4. Ethyl aceto acetate
5. Aceto acetanilide Benzophenone does not react with urea and isobutyl amine to form resins. Benzophenone-dicarboxylic acid, on the other hand readily forms resins with urea and isobutyl amine showing that a second reactive functional group, such as the carboxyl group is essential in addition to the ketonic body for reaction with an amino body to form a resin. Anthraquinone, likewise shows no resin formation with amines. Ethyl aceto acetate forms a pale yellow resin with urea, probably by hydrolysis of the ester to the ketonic acid. Aceto acetanilide forms a water-white resin with urea and an orange resin with isobutyl amine.

IX. Amines:
A.—
1. Urea
2. Isobutyl amine
3. Acetamide
4. Aniline
5. Hexamethylene tetramine
6. Formamide
7. Phthalimide
8. Succinimide
9. Thiourea
B. Amido bodies (or bodies capable of forming amino groups)—
1. Aceto acetanilide
2. Ammonium oxalate
3. Para amino benzoic acid
4. Aspartic acid The following are specific examples of how resins may be prepared according to our invention:

Example I

One mol of urea was reacted with one mol of benzoyl benzoic acid at 150° C. The ingredients were heated to 150° C. in 10 minutes and then held at 150° C. for 30 minutes or longer. As the reaction proceeded the acid number decreased and the color of the resinous product changed from water-white to yellow. The maturing of the resin is shown by the fact that the curing time on a hot plate at 200° C. decreased from 25 seconds to 2 seconds necessary to obtain gelatinization. This is shown by the following table:

TABLE I

Change in acid number and cure of a resin formed from one mol benzoyl benzoic acid and one mol urea

| Time at 150° C.[1] | Acid number | Cure[2] | Color of product |
|---|---|---|---|
| | | Seconds | |
| 0 minutes | 164 | 25 | Water-white. |
| 5 minutes | 160 | 14 | Do. |
| 10 minutes | 145 | 12 | Do. |
| 15 minutes | 132 | 9 | Pale yellow. |
| 20 minutes | 115 | 8 | Yellow. |
| 25 minutes | 98 | 5 | Do. |
| 30 minutes | 88 | 2 | Do. |

[1] 10 minutes were required to fuse the materials and obtain 150° C.
[2] Hot plate temperature 200° C.

When means are used to protect the color which are known to the art, a much lighter colored product is obtained.

Example II

To one mol of benzoyl benzoic acid, two mols of isobutyl amine were added. An exothermic reaction takes place which warms the mixture of ingredients to approximately 70° C. These ingredients are allowed to react from their own heat for a period of 10–30 minutes and then when the reaction has run its course, the reaction may be carried further by supplying heat to the reaction mixture. The heating is best done at about 150° C. using a reflux condenser to prevent the escape of isobutyl amine. When the refluxing has proceeded far enough so that there is no odor of isobutyl amine the condenser may be removed and heating discontinued. This process forms a pale straw colored resin. This material was soluble, while hot, in mineral spirits about one volume to one volume, but when it cooled the resin precipitated from solution. When this material was thinned with butanol, it formed a very stable solution which blended with practically all of the commercial types of alkyd resins even if they were already cut 50% in mineral spirits.

Example III

One mol of urea and two mols of crotonic acid were heated to 200° C. in 10 minutes. The temperature was then held at 200° C. for 10 minutes longer. The advancement of the resin is shown by the following table:

TABLE II

Change in acid number and cure of a resin formed from two mols of crotonic acid and one mol of urea

| Time at 200° C.[1] | Acid number | Cure[2] | Color of product |
|---|---|---|---|
| | | Seconds | |
| 0 minutes | 183 | 37 | Brown. |
| 5 minutes | 145 | 30 | Do. |
| 10 minutes | 63 | 19 | Do. |

[1] 10 minutes were required to fuse the material and reach 200° C.
[2] Hot plate temperature 200° C.

Example IV 30 parts by weight (0.5 mol) of urea were heated with 300 parts by weight of W. W. rosin (approximately 1.0 mol of abietic acid) heating being carried out according to the following schedule: The rosin was heated to 100° C. and then the urea was added gradually. An exothermic reaction took place upon adding urea which raised the temperature to 165° C. with considerable foaming and a slight darkening of color. After holding 10 minutes at 165° C. the melting range of rosin was increased from an original melting range of 59–68° C. At the end of that time the acid number was 140 as compared to 163 for untreated rosin. This product is completely soluble in toluol, but insoluble in mineral spirits. It is soluble in a mixture of 3 parts of mineral spirits and one part of toluol. Resins of this type are of value for varnishes and lacquers. The customary methods of obtaining lighter colors when applied to these products are within the scope of this invention.

It is to be understood that replacing of gum rosin by wood rosin, Burgundy pitch or rosins from various other geographical locations are included under this example. Varying the proportion of reaction ingredients in order to correspond with the various amount of abietic acid of these products can be easily accomplished by those skilled in the art of formulation.

*Example V*

10 parts by weight of thiourea is reacted with 75 parts by weight of rosin (mostly abietic acid). Upon melting the rosin, the thiourea was added and an exothermic reaction similar to that in Example IV was obtained. After 10 minutes heating at 160° C. a light orange hard, brittle resin was obtained which had a melting range of 80–100° C. as compared to the melting range of 59–68° C. which was obtained on the original rosin used. This resinous product is soluble in both toluol and mineral spirits.

*Example VI*

One mol of lactic acid when in contact with one mol of isobutyl amine undergoes an exothermic reaction which raises the temperature to approximately 80° C. At this stage it is a water-white balsam. Upon further heating this product turns to a yellow color at about 112° C. and to an orange color at about 175° C. Upon further heating a brown sticky balsam results which appears to be of value as a resin plasticizer.

The mol ratios or proportions of the reacting ingredients given in the above examples are in no way to be considered as a limitation of the scope of this invention. The well known skill of resin cooking may be applied to this new family of resins in many cases with desirable results, for example:— Protection from air by an inert atmosphere may be used to protect the color of the resin from darkening. Likewise vacuum treatment may be used to remove the products of reaction and raise the melting points. Bleaching agents may be used. The solutions may be filtered to clarify and stabilize them.

This family of resins made from acids and amines may be modified by other ingredients to vary the properties in much the same way that alkyd resins made from polybasic acids and polyhydric alcohols have been modified with the fatty acids, resinous acids and phenolic condensation products. We anticipate that many such modifications of this family of resins will eventually be made to form new products with new and still further useful properties. It is to be understood, however, that such modifications also come under the scope of this invention.

Conversely, other resinification products, varnish bases, etc., which are modified with this family of resins are to be considered as applications of this invention and also included by it. As an example for a use of our invention to modify other resinous products the following is a good example: the resin made from benzoyl benzoic acid and isobutyl amine as shown in Example II is used in combination with the urea-formaldehyde condensation process. 200 parts of the resin prepared as in Example II, and 62 parts of formaldehyde (commercial solution 37–40%), and 30 parts of urea are reacted together. First the formaldehyde is added to the resin made from benzoyl benzoic acid and isobutyl amine and a cloudy white precipitation occurs during the initial stages of reaction, but this soon clears up between 50–60° C. When the formaldehyde is added the temperature rises from room temperature to 50–70° C. Upon adding 30 parts of urea the solution became somewhat viscous, but it becomes clear upon gradually increasing the temperature to 95° C. and holding. The material becomes more and more viscous but still remains clear. When the desired viscosity is obtained the material may be thinned with butanol to a 60% solution. This clear straw colored viscous solution in butanol is miscible with all types of commercial alkyd resin solutions, such as the solutions commercially known under the trade-mark "Beckosol", which are oil or acid modified types of polybasic acid-polyhydric alcohol resins, in solution form, using hydrocarbon solvents, either of the aromatic or aliphatic type. The product is soluble in butanol, xylol or toluol to practically any proportion and soluble to approximately equal parts by volume in mineral spirits. This modified urea-formaldehyde condensation product bakes out to a clear and hard film either by itself or in combination with any of the above mentioned alkyd resins showing complete compatability of the resins even in a baked film where the solvents have had a chance to evaporate.

Resins prepared according to Example IV, for instance, may be used in place of ester gum, in oleo-resinous varnishes, nitro cellulose lacquers and with other cellulose derivatives such as ethylcellulose. A lacquer was made from the resin in Example IV as follows:

|  | Parts |
|---|---|
| Resin from Example IV | 10 |
| Toluol | 10 |
| 0.5 second nitrocellulose | 5 |
| Dibutyl phthalate | 6 |

The resin imparted adhesion and hardness to the lacquer film in a satisfactory manner for a relatively cheap lacquer. A 30 gallon varnish was prepared by heating the resin of Example IV with China-wood oil to 550° F. in 30 minutes and holding for 5 minutes at 550° F. The varnish was allowed to cool to 420° F. Then it was thinned with mineral spirits to 55% solids. This varnish had excellent gas-proof qualities, flexibility, hardness, and adhesion and should be of great value where low cost is necessary.

Products made along orthodox varnish and lacquer technology with resins of this family, are to be considered as modifications of this resin family and to be covered by the scope of this invention. We do not claim to be able to make a resinous product with every acid or amine which comes under the group which we have outlined, but we do claim all the useful resinous products which it is possible to make from this grouping.

It is to be further understood that certain catalysts may be used to promote further resinification of these ingredients. In some cases where resins form with difficulty, we have found it especially helpful to introduce such a catalyst. An instance of this is in the case of isobutyl amine and adipic acid where it is found advantageous to add a small amount of triethanolamine to catalyze the reaction because resinification does not take place readily without it.

By amido bodies it is intended to cover amines and susbtances capable of forming amines.

By the term "polyfunctional carboxylic acids" it is intended to cover carboxylic acids having two or more reactive points.

We claim:
1. A process for producing a resinous mass which comprises reacting isobutyl amine and a polyfunctional carboxylic acid, said amine and said acid constituting the principal reacting components.

2. A resinous mass produced by reacting isobutyl amine and a polyfunctional carboxylic acid, said amine and said acid constituting the principal reacting components.

ALMON G. HOVEY.
THEODORE S. HODGINS.